US006441369B1

(12) United States Patent
Vestal et al.

(10) Patent No.: US 6,441,369 B1
(45) Date of Patent: Aug. 27, 2002

(54) TANDEM TIME-OF-FLIGHT MASS SPECTROMETER WITH IMPROVED MASS RESOLUTION

(75) Inventors: Marvin L. Vestal, Framingham; Stephen C. Gabeler, Sudbury, both of MA (US)

(73) Assignee: PerSeptive Biosystems, Inc., Framingham, MA (US)

( * ) Notice: Subject to any disclaimer, the term of this patent is extended or adjusted under 35 U.S.C. 154(b) by 83 days.

(21) Appl. No.: 09/712,882

(22) Filed: Nov. 15, 2000

(51) Int. Cl.[7] ........................... B01D 54/44; H01J 49/00

(52) U.S. Cl. ....................... 250/287; 250/281; 250/282; 250/292; 250/288

(58) Field of Search ................................ 250/292, 287, 250/288, 282, 281

(56) References Cited

U.S. PATENT DOCUMENTS 4,458,149 A 7/1984 Muga
5,202,563 A 4/1993 Cotter et al.
5,206,508 A 4/1993 Alderdice et al.
5,625,184 A 4/1997 Vestal et al.
5,627,369 A 5/1997 Vestal et al.
6,040,575 A * 3/2000 Whitehouse et al. ....... 250/282
6,057,543 A 5/2000 Vestal et al.
6,204,500 B1 * 3/2001 Whitehouse et al. ....... 250/282
6,348,688 B1 * 2/2002 Vestal ....................... 250/282

OTHER PUBLICATIONS

Vestal, Marvin, et al., "Resolution and Mass Accuracy in Matrix–Assisted Laser Desorption Ionization—Time–of–Flight", Journal of the American Society for Mass Spectrometry, 1998, 9, pp. 892–911.

* cited by examiner

*Primary Examiner*—John R. Lee
*Assistant Examiner*—Kalimah Fernandez
(74) *Attorney, Agent, or Firm*—Andrew T. Karnakis

(57) ABSTRACT

A tandem time-of-flight mass spectrometer is described. The spectrometer includes a pulsed source of ions that focuses a packet of ions substantially within a predetermined mass-to-charge ratio range onto a focal plane in a flight path of the ions. An ion selector receives the focused packet of ions and selects ions substantially within the predetermined mass-to-charge ratio range and rejects substantially all other ions. An ion fragmentor that fragments a fraction of the selected ions is positioned in the flight path of the selected ions. A pulsed ion accelerator that accelerates the selected ions and fragments thereof is positioned in a flight path of the selected ions and fragments thereof after the ion fragmentor. An electrode is positioned in the flight path of the accelerated selected ions and fragments thereof after the pulsed ion accelerator. In operation, the electrode is biased with a time varying bias voltage that increases the energy of the fragments relative to the selected ions.

53 Claims, 7 Drawing Sheets

TANDEM TIME-OF-FLIGHT MASS SPECTROMETER WITH IMPROVED MASS RESOLUTION

FIELD OF INVENTION

The invention relates generally to mass spectrometers and specifically to tandem time-of-flight mass spectrometers.

BACKGROUND OF INVENTION

Mass spectrometers vaporize and ionize a sample and determine the mass-to-charge ratio of the resulting ions. Time-of-flight (TOF) mass spectrometers determine the mass-to-charge ratio of an ion by measuring the amount of time it takes a given ion to migrate from the ion source to the detector, under the influence of electric fields. The time it takes for an ion to reach the detector, for electric fields of given strengths, is a direct function of its mass and an inverse function of its charge.

Recently TOF mass spectrometers have become widely accepted, particularly for the analysis of relatively nonvolatile biomolecules, and other applications requiring high speed, high sensitivity, and/or wide mass range. New ionization techniques such as matrix-assisted laser desorption/ionization (MALDI) and electrospray (ESI) have greatly extended the mass range of molecules that can be analyzed by mass spectrometers. These techniques can produce intact molecular ions in the gas phase suitable for analysis. TOF mass spectrometers have unique advantages for these applications. The recent development of delayed ion extraction, for example, as described in U.S. Pat. Nos. 5,625,184, 5,627,369, and 6,057,543 has made high resolution and precise mass measurement routinely available with MALDI-TOF mass spectrometers. The entire disclosure of U.S. Pat. Nos. 5,625,184, 5,627,369, and 6,057,543 are incorporated herein by reference. Orthogonal injection with pulsed extraction has provided similar performance enhancements for ESI-TOF. These techniques provide excellent data on the molecular weight of samples. However, these techniques provide little information on molecular structure. Traditionally tandem mass spectrometers (MS-MS) have been employed to provide structural information. Tandem MS-MS instruments are described in pending U.S. patent application Ser. No. 09/020,142, filed on Feb. 6, 1998, and assigned to the present assignee. The entire disclosure of U.S. patent application Ser. No. 09/020,142 is incorporated herein by reference. In MS-MS instruments, a first mass analyzer is used to select a primary ion of interest, for example, a molecular ion of a particular sample. The ion is then caused to fragment by increasing its internal energy, for example, by causing the ion to collide with a neutral molecule. The spectrum of fragment ions is then analyzed by a second mass analyzer. The structure of the primary ion can be determined by interpreting the fragmentation pattern.

A technique known as post-source decay (PSD) can be employed in MALDI-TOF mass spectrometers, but the fragmentation spectra are often relatively weak and difficult to interpret. Some prior art mass spectrometers include a collision cell that causes some of the ions to undergo high energy collisions with neutral molecules to enhance the production of low mass fragment ions and produce some additional fragmentation. However, the spectra produced by these prior art mass spectrometers are also difficult to interpret. Prior art orthogonal ESI-TOF mass spectrometers typically produce fragmentation by causing energetic collisions to occur in the interface between the atmospheric pressure electrospray and the evacuated mass spectrometer.

However, these prior art mass spectrometers have no means for selecting a particular primary ion.

The most common form of tandem mass spectrometry is the triple quadrupole mass spectrometer. The first quadrupole selects the primary ion. The second quadrupole is typically maintained at a sufficiently high pressure and voltage so that multiple low energy collisions occur. The third quadrupole is scanned to analyze the fragment ion spectrum. The resulting spectra are typically easy to interpret and numerous analysis techniques have been developed. For example, techniques have been developed for determining the amino acid sequence of a peptide from such spectra.

There are several prior art tandem mass spectrometers that use time-of-flight mass spectrometer techniques for selecting a primary ion and/or detecting and analyzing fragment ions. One prior art tandem mass spectrometer uses two quadrupole mass spectrometers and a TOF mass spectrometer. The first quadrupole selects the primary ion. The second quadrupole is maintained at a sufficiently high pressure and voltage so that multiple low energy collisions occur. The TOF mass spectrometer detects and analyzes the fragment ion spectrum.

Another prior art tandem mass spectrometer that uses time-of-flight mass spectrometer techniques includes two linear time-of-flight mass analyzers that use surface-induced dissociation (SID). One such mass spectrometer includes an ion mirror. U.S. Pat. No. 5,206,508 describes a tandem mass spectrometer that uses either linear or reflecting analyzers, which are capable of obtaining tandem mass spectra for each parent ion without requiring the separation of parent ions of differing mass from each other.

U.S. Pat. No. 5,202,563 describes a tandem time-of-flight mass spectrometer that includes a grounded vacuum housing, two reflecting-type mass analyzers coupled via a fragmentation chamber, and flight channels electrically floated with respect to the grounded vacuum housing. These mass spectrometers are generally limited to analyzing relatively small molecules and do not provide the sensitivity and resolution required for biological applications, such as sequencing of peptides or oligonucleotides.

For peptide sequencing and structure determination by tandem mass spectrometry, both mass analyzers must have at least unit mass resolution and good ion transmission over the mass range of interest. MS-MS systems are typically used for peptide sequencing above molecular weight 1000. These systems may include two double-focusing magnetic deflection mass spectrometers having high mass range. Although these instruments provide high mass range and mass accuracy, they are limited in resolution, compared to time-of-flight mass spectrometers, and are not readily adaptable for use with modem ionization techniques such as MALDI and electrospray. These instruments are also very complex and expensive.

SUMMARY OF THE INVENTION

The present invention relates to improving the performance of tandem TOF mass spectrometers. A discovery of the present invention is that the resolution of tandem TOF mass spectrometers can be improved by applying a time varying bias voltage that increases the energy of the fragments relative to the selected ions. Another discovery of the present invention is that near optimum resolution can be achieved in both the first and second mass spectrometer unit of a tandem TOF mass spectrometer by providing an additional grid interposed between the timed ion selector and the fragmentation chamber. Increasing the energy of the fragments relative to the selected ions and establishing near optimum resolution in both the first and second mass spectrometer units in a tandem TOF mass spectrometer according to the present invention results in a high resolution fragment spectra that has a resolution that is nearly independent of mass.

Accordingly, the present invention features a tandem time-of-flight mass spectrometer that includes a pulsed source of ions that focuses a packet of ions substantially within a predetermined mass-to-charge ratio range onto a focal plane in a flight path of the ions. An ion selector receives the focused packet of ions and selects ions substantially within the predetermined mass-to-charge ratio range and rejects substantially all other ions. In one embodiment, the ion selector is positioned substantially at the focal plane. In another embodiment, the focal plane is located between the ion selector and the pulsed ion accelerator.

An ion fragmentor that fragments a fraction of the ions is positioned in the flight path of the ions. In one embodiment, the ion fragmentor is positioned after the ion selector in the fight path of the selected ions. In another embodiment, the ion selector is positioned after the ion fragmentor in the flight path of the fragmented ions. In one embodiment, the ion selector and the ion fragmentor are contained in a single device.

A drift space may be positioned in a flight path of the selected ions and fragments thereof that facilitates fragmentation. A pulsed ion accelerator that accelerates and refocuses the selected ions and fragments thereof at a second focal plane in a fight path of the ions is positioned in a flight path of the selected ions and fragments thereof after the ion fragmentor. In one embodiment, the second focal plane is formed substantially proximate to a grid coupled to the entrance of a conductive drift tube positioned in the flight path of the accelerated selected ions and fragments thereof after the pulsed ion accelerator.

In one embodiment, the grid and conductive drift tube comprise an electrode that is electrically isolated from ground. The electrode is biased with a time varying bias voltage that increases the energy of the fragments relative to the selected ions. The increase in kinetic energy of the fragments at least partially compensates for an energy loss experienced by the fragments due to fragmentation. In one embodiment, the kinetic energy of the fragments is increased to substantially equal the kinetic energy of the selected ions. In one embodiment, the length of the conducting drift tube is chosen so that the selected ions and fragments thereof substantially co-exist during a period where the time varying bias voltage is non-zero. A substantially field-free drift region may be positioned in the flight path of the selected ions and fragments thereof after the conducting drift tube. In one embodiment, an ion mirror is positioned in the path of the selected ions and the fragments thereof after the electrode. The ion mirror compensates for the effects of the initial kinetic energy distribution. An ion detector is positioned after the electrode and the ion mirror. The ion detector detects the selected ions and fragments thereof.

The present invention also features a tandem time-of-flight mass spectrometer that includes at least two pulsed ion accelerators. The spectrometer includes a pulsed source of ions that focuses a packet of ions substantially within a predetermined mass-to-charge ratio range onto a focal plane in a flight path of the ions. An ion selector is positioned substantially at the focal plane and receives the focused packet of ions. The ion selector selects ions substantially within the predetermined mass-to-charge ratio range and rejects substantially all other ions.

A first pulsed ion accelerator that refocuses the selected ions at a second focal plane in a fight path of the ions is positioned in the flight path of the selected ions. An ion fragmentor that fragments a fraction of the selected ions is positioned in the flight path of the selected ions. A second pulsed ion accelerator that accelerates the selected ions and fragments thereof is positioned at the second focal plane in a flight path of the selected ions and fragments thereof. An electrode that is biased with a time varying bias voltage, which increases the energy of the fragments relative to the selected ions is positioned in the flight path of the accelerated selected ions and fragments thereof after the second pulsed ion accelerator.

The present invention also features a method for improving mass resolution in tandem time-of-flight mass spectrometers. The method includes generating a pulse of ions from a sample of interest. Ions from the pulse of ions that are substantially within a predetermined mass-to-charge ratio range are selected and substantially all other ions are rejected. In one embodiment, the ions are selected by focusing generated ions having a predetermined mass-to-charge ratio range onto a timed ion selector and transmitting the selected ions through the timed ion selector while substantially blocking all other ions.

A fraction of the selected ions are fragmented. In one embodiment, the selected ions and fragments thereof are passed through a nearly field-free region after fragmentation to allow the ions to substantially complete fragmentation. The selected ions and fragments thereof are accelerated after fragmentation. The selected ions and fragments thereof are then exposed to a time varying voltage bias that adds energy to the fragments, which at least partially compensates for energy lost due to fragmentation. The selected ions and fragments thereof are then analyzed by time-of-flight mass spectrometry.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF THE INVENTION

The present invention relates to improving the resolution of tandem mass spectrometers by compensating for the energy deficit due to fragmentation. The resolution of tandem mass spectrometers is limited, at least in part, because the fragmentation causes an energy deficit that is not corrected in prior art mass spectrometers. After fragmentation, the fragment ions have essentially the same velocity distribution as the parent ions. However, the kinetic energy of the fragments is lower than the kinetic energy of the parent ions by an amount corresponding to the kinetic energy of the neutral fragment that separates from the ion in the fragmentation process.

Consequently, the lower mass fragment ions are not properly focused under operating conditions that correspond to optimum focusing of the parent ions. Fragment ions can be refocused with an ion mirror by reducing the voltage applied to the ion mirror, however, this would defocus the higher mass ions. The reduced resolution caused by the energy deficit is particularly severe when the desired mass range is relatively large, or when relatively higher collision energies are employed.

The tandem TOF mass spectrometer according to the present invention includes a fragment energy correction device that improves resolution by applying a time varying accelerating field that increases the energy of the fragment ions relative to the energy of the intact precursor ions to compensate for the energy lost in the fragmentation process. Time varying voltages have been used in prior art mass spectrometers for velocity and space compaction.

U.S. Pat. No. 4,458,149 describes a mass spectrometer that uses a time varying voltage to simultaneously achieve velocity and space compaction. A time dependent voltage is applied to a grid system that establishes a time dependent electric field that causes the slower moving ions to receive greater acceleration than the faster moving ions. The voltage is adjusted so that ions within a given iso-mass packet are velocity compacted so that they emerge from the time dependent field region with near equal velocities. Ions at the advanced or leading edge of the iso-mass packet receive a lesser acceleration than ions at the retarded or trailing edge. Consequently, the ions within a given iso-mass packet are also space compacted during a subsequent drift period as the trailing ions catch up to the leading ions. The prior art including U.S. Pat. No. 4,458,149 does not describe the use of time varying electric fields for correcting the energy of fragments to improve the mass resolution of tandem mass spectrometers.

Figure 1:
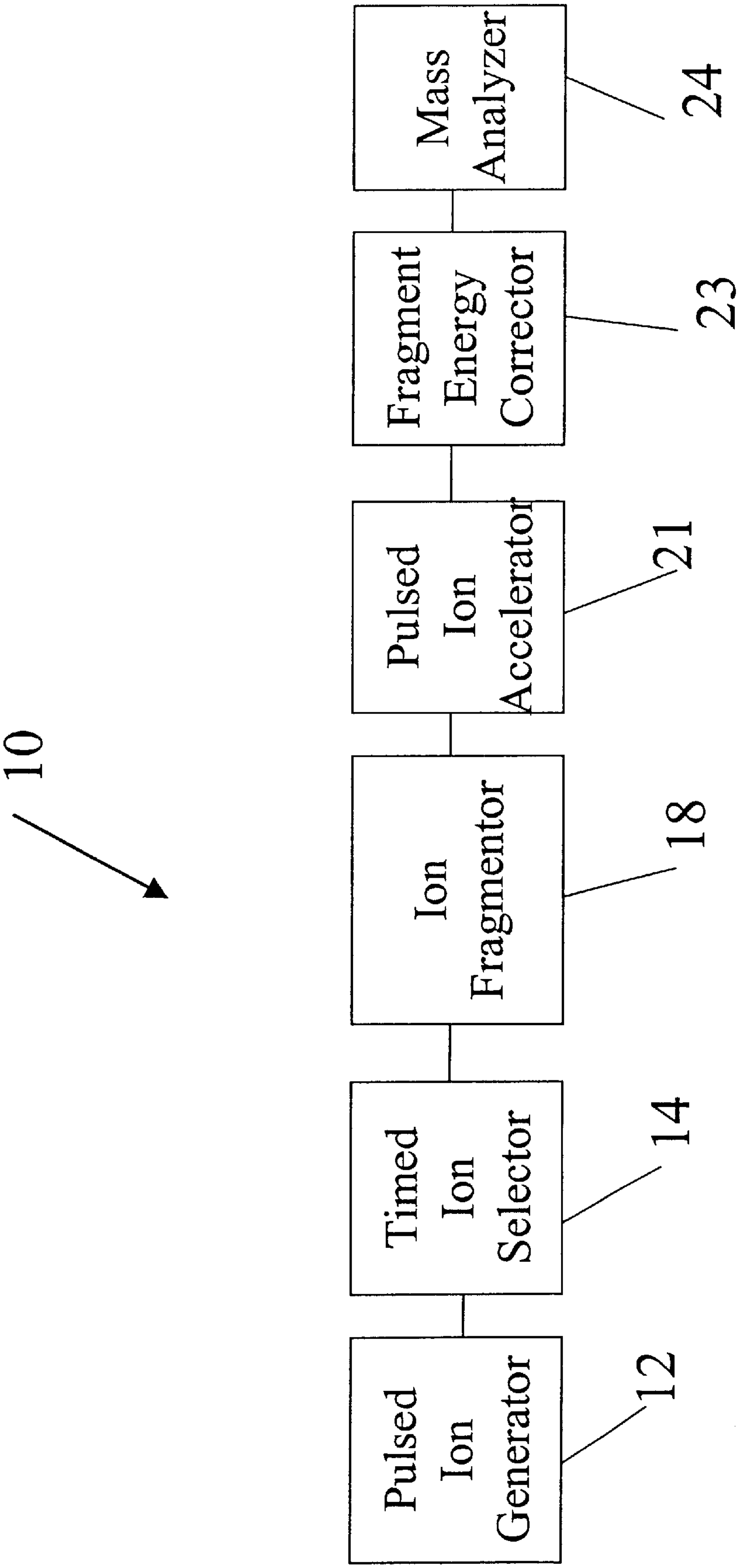
FIG. 1 illustrates a block diagram of a tandem time-of-flight mass spectrometer of the present invention that includes a fragment energy correction device according to the present invention.

FIG. 1 illustrates a block diagram of a tandem time-of-flight mass spectrometer 10 of the present invention that includes a fragment energy correction device according to the present invention. A pulsed ion generator 12 generates ions within a short time period and focuses a packet of ions substantially within a predetermined mass-to-charge ratio range onto a focal plane in a flight path of the ions. The pulsed ion generator 12 may be any pulsed ion source. For example, the pulsed ion generator 12 may be a laser desorption/ionization ion source having delayed extraction. The pulsed ion generator 12 may also be an injector that injects ions into a field-free region and a pulsed ion accelerator that extracts the ions in a direction that is orthogonal to a direction of injection.

A timed ion selector 14 is positioned in the flight path of the generated ions. The ion selector 14 receives the focused packet of ions and selects ions substantially within the predetermined mass-to-charge ratio range and rejects substantially all other ions. The ion selector 14 may be any ion selector. In one embodiment, the ion selector 14 may select ions by transmitting ions having substantially the predetermined mass-to-charge ratio and by blocking substantially all other ions. For example, the ion selector may include a drift tube and a timed ion deflector.

An ion fragmentor or fragmentation chamber 18 is positioned in the flight path of the selected ions. The ion fragmentor fragments a fraction of the selected ions. The ion fragmentor 18 can be any ion fragmentor. For example, the ion fragmentor 18 can be a collision cell 44 that causes the packet of ions to collide with neutral molecules, thereby causing ions in the packet of ions to energize sufficiently to fragment into ionic and neutral fragments. The ion fragmentor 18 may also be a photo-dissociation cell wherein ions are irradiated with a beam of photons. In addition, the ion fragmentor 18 can be a surface dissociation ion fragmentor that causes ions to collide with a solid or liquid surface.

A pulsed ion accelerator 21 is positioned in a flight path of the selected ions and fragments thereof after the ion fragmentor 18. The pulsed ion accelerator 21 accelerates the selected ions and fragments thereof. A fragment energy correction device 23 is positioned in the path of the accelerated selected ions and fragments thereof. The fragment energy correction device 23 increases the energy of the fragments relative to the selected ions by an amount corresponding to the loss of the neutral fragment. In one embodiment, the fragment energy correction device 23 comprises an electrode that is biased with a time varying bias voltage that increases the energy of the fragments relative to the selected ions.

A mass analyzer 24 is positioned in the path of the accelerated selected ions and fragments thereof In one embodiment the mass analyzer 24 comprises a time-of-flight analyzer including a field-free drift region, an ion reflector, and an ion detector.

Figures 2A, 2B:
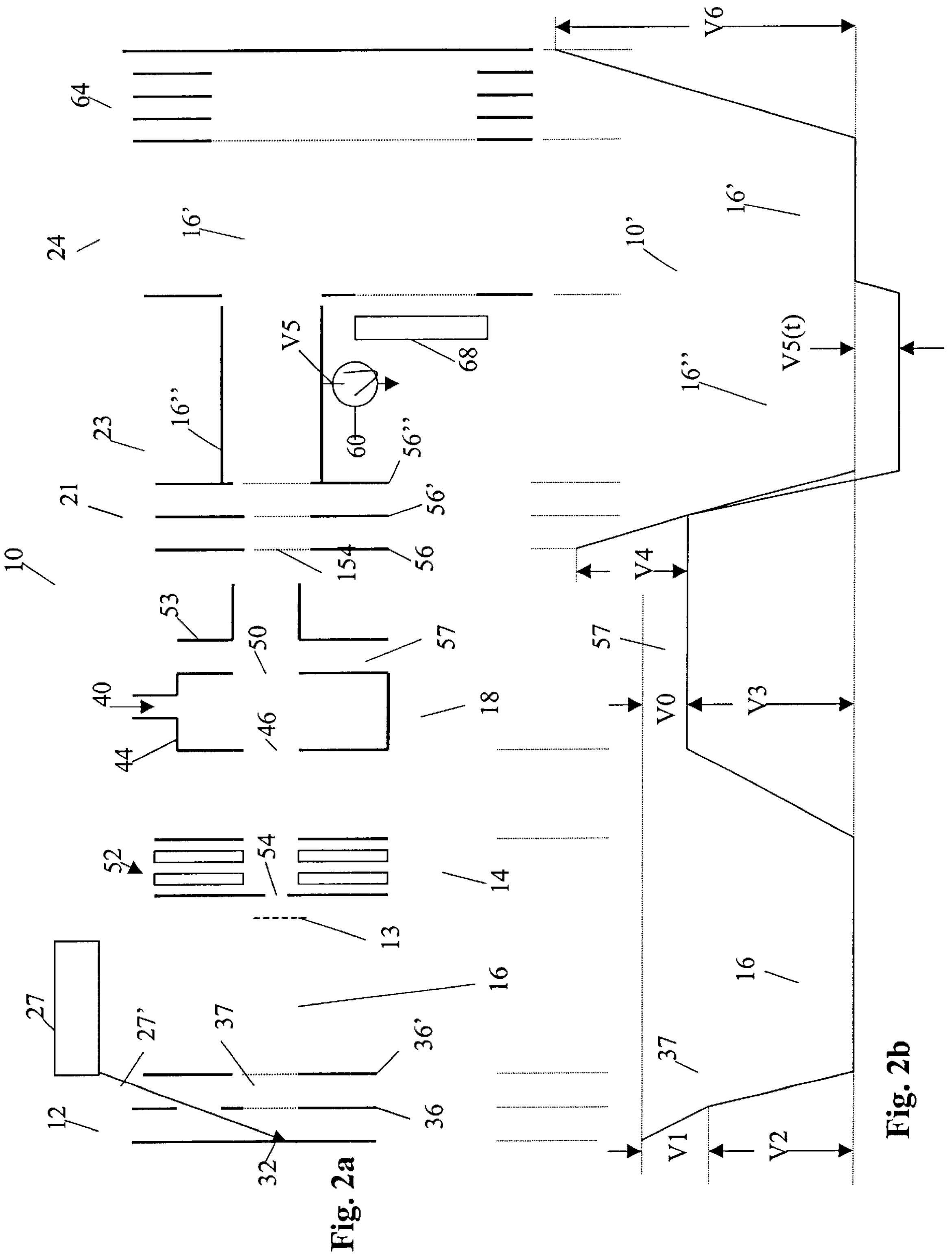
FIG. 2*a* illustrates a schematic diagram of a tandem time-of-flight mass spectrometer of the present invention that includes a fragment energy correction device according to the present invention.
FIG. 2*b* illustrates a potential diagram of a tandem time-of-flight mass spectrometer of FIG. 2*a* that includes a fragment energy correction device according to the present invention.

FIG. 2*a* illustrates a schematic diagram of a tandem time-of-flight mass spectrometer 10 of the present invention that includes a fragment energy correction device according to the present invention. The mass spectrometer 10 includes a pulsed ion generator 12 that includes a laser 27 that irradiates a sample to be ionized with a laser beam 27' and a first 36 and second source extraction grid 36' that form a first ion acceleration region 37. The laser 27 generates ions in the duration of the laser pulse and a potential is applied to the sample and the first 36 and second source extraction grid 36' at a predetermined time delay after ionization, thereby extracting the ions. A packet of ions within a predetermined mass-to-charge ratio range is focused onto a focal plane 13 in a flight path of the ions.

A timed ion selector 14 is positioned in the flight path of the generated ions. In one embodiment, the ion selector 14 is positioned at the focal plane. The ion selector 14 includes a first drift space 16 and a pulsed ion deflector 52. The first drift space 16 may include an ion guide. The ion guide may be any type of ion guide such as a wire, lens, or any other means of improving ion transmission. The pulsed ion deflector 52 includes a small aperture 54 that is positioned proximate to its entrance thereby providing free passage of the ion beam, while also limiting the flow of neutral gas. The ion selector 14 receives the focused packet of ions and selects ions substantially within the predetermined mass-to-charge ratio range and rejects substantially all other ions.

An ion fragmentation chamber 18 is positioned in the flight path of the selected ions. The ion fragmentation chamber 18 includes a collision cell 44 that receives a gas that causes the packet of ions to collide with neutral molecules, thereby causing ions in the packet of ions to energize sufficiently to fragment into ionic and neutral fragments. The ion fragmentation chamber 18 includes a small entrance aperture 46 and an exit aperture 50 that allow free passage of the ion beam, but limit the flow of neutral gas.

The ion fragmentation chamber includes an electrode 53 that is positioned adjacent to the collision cell 44 and biased to form a second drift space 57. The second drift space 57 may include an ion guide. First 56, second 56' and third 56" ion accelerator grids are positioned adjacent to the electrode 53 and form a second ion acceleration region 21 that accelerates the selected ions and fragments thereof. In one embodiment the third ion accelerator grid 56" is attached to conducting tube 16" and forms energy corrector 23.

The spectrometer 10 of the present invention can use numerous other grid configurations. For example, in another embodiment, the first accelerator grid 56 is positioned directly adjacent to the exit aperture 50, eliminating the electrode 53. This embodiment is used for measurements where the fragmentation is substantially completed in the collision cell 44. Many of the electrodes shown in the embodiments illustrated in FIG. 2*a* are represented as including grids over the apertures that allow ions to be transmitted. These grids bound the electric fields and provide substantially uniform fields such as illustrated in FIG. 2*b*. Use of such fields substantially reduces uncertainties in accurately predicting the performance of the instrument, but are not essential for achieving the benefits of this invention. The grids covering some or all of the apertures may be omitted in some embodiments.

The fragment energy correction device 23 is positioned in the path of the accelerated selected ions and fragments thereof. In one embodiment, an electrode or conducting tube 16" is positioned adjacent to the second ion accelerator grid 56'. The conducting tube 16" is isolated from ground and electrically coupled to a time varying voltage source 60. The time varying voltage source may be a programmable time varying voltage source.

The time varying voltage source applies a time varying voltage to the conducting tube 16" that increases the energy of the fragments relative to the selected ions by an amount corresponding to the loss of the neutral fragment. Since the lower mass fragment ions exit the source first, a time varying voltage can be applied to the conducting tube 16" that exactly compensates the energy of the fragment ions for the energy deficit caused by the fragmentation. The voltage varies in time so that as each packet of ions with a specific value of m/z exits the source. The proper compensating voltage is applied to the conducting tube 16" such that the kinetic energy of the ions after they exit the conducting tube 16" and enter a field-free space 16' is independent of m/z. In one embodiment the conducting tube 16" is sufficiently long so that the lowest mass of interest does not exit the tube before the parent ion enters the tube.

The mass analyzer 24 includes a field-free drift space 16' that is positioned in the path of the selected ions and the energy corrected fragments. The field-free drift space 16' may include an ion guide or ion focusing electrodes. An ion reflector 64 (also called an ion mirror and a reflectron) is positioned in the path of the selected ions and energy corrected fragments after the field-free drift space 16'.

The ion reflector 64 includes one or more homogeneous, retarding, electrostatic fields. The ion reflector 64 is used to compensate for the effects of the initial kinetic energy distribution. As the ions penetrate the reflector, with respect to the electrostatic fields, they are decelerated until the velocity component in the direction of the field becomes zero. Then, the ions reverse direction and are accelerated back through the reflector. The ions exit the reflector with energies identical to their incoming energy but with velocities in the opposite direction. Ions with larger energies penetrate the reflector more deeply and consequently will remain in the ion reflector for a longer time. In a properly designed ion reflector, the potentials are selected to modify the flight paths of the ions such that ions of like mass and charge arrive at the detector at the same time regardless of their initial energy.

A detector 68 is positioned in the path of the selected ions and energy corrected fragments thereof and detects the selected ions and energy corrected fragments thereof as a function of time. The pulsed ion generator 12, the timed ion selector 14, the ion fragment chamber 18, the pulsed ion accelerator 21, the fragment energy correction device 23, and the mass analyzer 24 are enclosed in a vacuum housing (not shown). The vacuum housing is connected to a vacuum pump through a gas outlet (not shown). The vacuum pump maintains the background pressure of neutral gas in the vacuum housing sufficiently low so that collisions of ions with neutral molecules are unlikely to occur.

FIG. 2*b* illustrates a potential diagram of a tandem time-of-flight mass spectrometer 10 of FIG. 2*a* that includes a fragment energy correction device according to the present invention. The first acceleration region has a graded potential from V1+V2 to ground. The sample to be ionized is initially biased at accelerating potential V1 and the potential is increased by an amount V2 at a predetermined time after ionization. The first extraction grid 36 is biased at potential V2 and the second extraction grid 36' is at ground potential.

The first drift space 16 is at ground potential. The collision cell 44 is at potential V3. Potential V3 is selected to achieve the desired collision energy V0. The second drift space 57 is biased at V3. The first ion accelerator grid 56 is initially biased at potential V3 and at a predetermined time after the selected ions pass through the extraction grid 56 the potential on extraction grid 56 is increased by an amount V4 to accelerate the selected ions and fragments thereof. The second ion accelerator grid 56' is biased at potential V3.

The conducting tube 16" of the fragment energy correction device 23 is biased with a time varying voltage having an amplitude equal to V5 along a third drift space which is the length of the conducting tube 16". The time varying voltage increases the energy of the fragments relative to the selected ions and, in one embodiment, increases such energy of the fragments by an amount corresponding to the loss of the neutral fragment. The field-free drift space 16' of the analyzer 24 is at ground potential and forms a fourth drift space. The ion reflector 64 has a graded potential as described above. In this example, the field-free drift spaces 16 and 16' are each referenced to ground potential; however, it is understood that the potential applied to these drift spaces could be floated relative to ground.

In operation, a sample 32 to be analyzed is ionized by the pulsed ion generator 12, which produces a pulse of ions. In one embodiment, the pulsed ion generator 12 employs Matrix Assisted Laser Desorption/Ionization (MALDI). In this embodiment, the laser beam 27' impinges upon a sample plate having the sample 32 which has been mixed with a matrix capable of selectively absorbing the wavelength of the incident laser beam 27'.

At a predetermined time after ionization, the ions are accelerated by applying the accelerating potential V1+V2 to the sample 32 and potential V2 to the second source extraction grid 36'. After this acceleration, the ions travel through the first drift space 16 with velocities that are nearly proportional to the square root of their charge-to-mass ratio. That is, heavier ions travel more slowly than lighter ions. Thus, within the first drift space 16, the ions separate according to their mass-to-charge ratio with ions of higher mass traveling more slowly than those of lower mass.

The pulsed ion deflector 52 opens for a predetermined time period after ionization. This permits only selected ions, those ions arriving at the pulsed ion deflector 52 within the predetermined time window during which the pulsed ion deflector 52 is permitting access to the collision cell 44, to be transmitted. These ions have a selected range of mass-to-charge ratios. Other ions of higher or lower mass are rejected.

The selected ions entering the collision cell 44 through aperture 46 collide with the neutral gas entering through inlet 40. The collisions cause the selected ions to fragment. The energy of the collisions is approximately equal to the difference between the potential V1+V2 applied to the sample plate 32 and the potential V3 applied to the collision cell. In one embodiment, the pressure of the neutral gas in the collision cell 44 is maintained at about $10^{-3}$ torr and the pressure in the space surrounding the collision cell 44 is maintained at about $10^{-5}$ torr or less. Gas diffusing from the collision cell 44 through an ion entrance aperture 46 and ion exit aperture 50 is facilitated by a vacuum pump (not shown) connected to a gas outlet.

In another embodiment, a high-speed pulsed valve (not shown) is positioned in gas inlet 40 so as to produce a high-pressure pulse of neutral gas during the time when ions arrive at the fragmentation chamber 18 and, for the remainder of the time, the fragmentation chamber 18 is maintained as a vacuum. The neutral gas may be any neutral gas such as helium, air, nitrogen, argon, krypton, or xenon.

The electrode 53 is biased at the same potential V3 as the collision cell 44 so as to create a drift space for the selected ions to complete fragmentation. The potentials V3+V4 are rapidly applied to the first accelerator grid plate 56 thereby causing the selected ions and fragments thereof to accelerate in the second ion acceleration region.

The accelerated ions and fragments thereof pass through the fragment energy correction device 23 and are exposed to a time varying bias that has an amplitude that adds energy to the fragments, which at least partially compensates for energy lost due to fragmentation. The selected ions and fragments thereof are analyzed in the analyzer 24. The selected ions and energy corrected fragments thereof pass though the field-free drift tube 16' and into the ion reflector 64. The ion reflector 64 compensates for the effects of the initial kinetic energy distribution and directs the selected ions and energy corrected fragments to the ion detector 68. The detector 68 detects the selected ions and energy corrected fragments thereof as a function of time.

The time of flight of the selected ions and fragments thereof, starting from the time that the potential applied to the first accelerator grid 56 is rapidly switched from the initial value of V3 to the final value V4+V3 and ending with ion detection by the detector 68, is measured. The mass-to-charge ratio of the ion fragments is determined from the measured time.

The mass-to-charge ratio can be determined with very high resolution and accuracy by properly choosing the operating parameters. These parameters include the accelerating potential V1+V2, the potential V3 of the collision cell 44, the potential V4 and timing of the pulse applied to the first accelerator grid 56, the amplitude V5 and shape of the time varying voltage that is applied to the conducting tube 16" of the fragment energy correction device 23, and the potential gradient in the ion reflector.

Figures 3A, 3B:
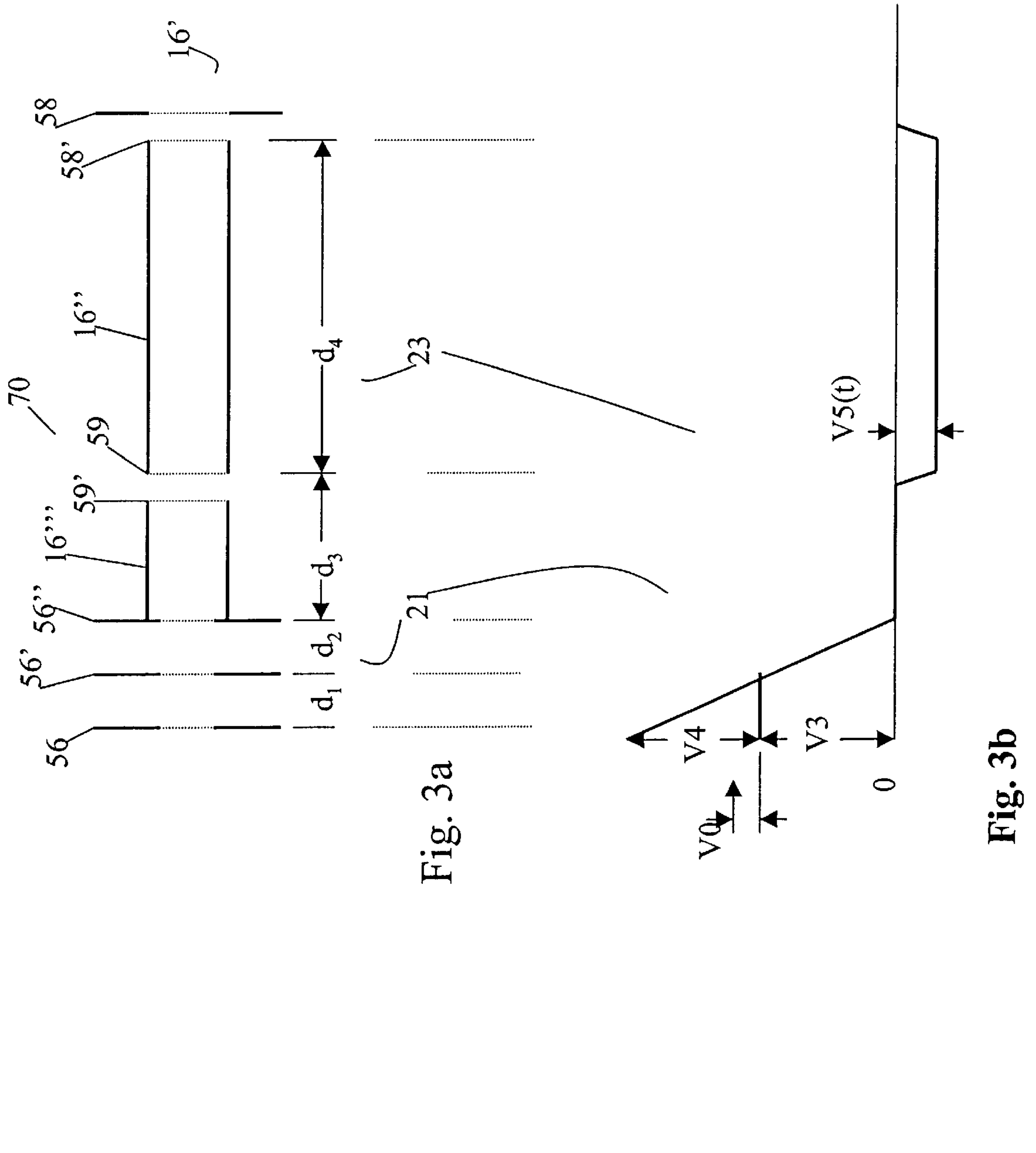
FIG. 3*a* illustrates a schematic diagram of a preferred embodiment of the fragment energy correction device according to the present invention.
FIG. 3*b* illustrates a potential diagram of a preferred embodiment of the fragment energy correction device according to the present invention.

A preferred embodiment 70 of the pulsed ion accelerator 21 and fragment energy correction device 23 according to the present invention is illustrated in FIG. 3*a*, and one example of suitable potentials applied in this embodiment is illustrated in FIG. 3*b*. In this embodiment the collision energy V0 is fixed at 1 kV, the potential V3 is 7 kV, and potential V4 is 14 kV. The potential V5 varies from −1 kV at zero time to zero volts at the time that the selected precursor ions passes through the grid 59 as required to correct for the energy lost by fragmentation. Zero on this time axis corresponds to the time at which the potential on accelerator grid 56 is increased from 7 kV to 14 kV.

The distances between grids 56 and 56' and between 56' and 56" are each 1 cm. The length of the conducting tube 16'" is 4 cm. Ideally the potential V5 varies with time so that the potential applied to the conducting tube 16" and grid 59 is exactly equal to the energy deficit of the fragment ion arriving at grid 59' at that time. This exactly cancels the energy deficit and all fragment ions passing through grid 59 have substantially the same kinetic energy as the selected precursor ions as they pass through grid 59 and enter into the field-free space 16'. The length of conducting tube 16" is sufficiently long so that all of the fragment ions greater than the minimum fragment mass of interest are traveling within tube 16" until the potential V5 has returned to zero. For purposes of this example the length $d_4$ is chosen to be 40 cm, which allows the energy of all fragment ions with mass greater than about 3% of the selected precursor mass to be accurately corrected.

The amplitude of the ideal correction voltage V5 is given by $$V5=-V0(1-m/m_p) \quad (1)$$

where V0 is the initial kinetic energy (eV), $m_p$ is the mass of the selected precursor ion, and m is the mass of the fragment ion. To achieve ideal performance V5 must have this value at the time a fragment ion of mass m passes through space between grids 59' and grid 59. The equations for calculating flight times of ions in electric fields are well known in the art (See Vestal and Juhasz, JASMS 1998, 9, 892–911. for example). The present calculation is slightly more complicated because the time varying potential V5 which is to be calculated has a small effect on the time at which a given fragment ion passes through grid 59. The effect of the time variation of potential V5 on the flight time of the ions to grid 59 is rather small and the ideal waveform for the time variation of potential V5 can be calculated with very high accuracy by successive approximations.

The general equation for calculating the time t that an ion requires to travel through a uniform electrical field is given by $$t=(v_f-v_i)/a \tag{2}$$

where $v_i$ is the initial velocity, $v_f$ is the final velocity at the exit from the field, and a is the acceleration that the ion receives in the field. By inserting appropriate conversion factors this equation can be written in terms of convenient units as $$t=1442.6(d/\Delta V)[(V_f)^{1/2}-(V_i)^{1/2}]m^{1/2} \tag{3}$$

where t is the flight time in nanoseconds, d is the length of the accelerating region in cm, ΔV is the potential difference applied across the accelerating region in volts, $V_i$ and $V_f$ are the initial and final kinetic energies of the ions in eV, respectively, and m is the mass of the ion in daltons.

The time t that an ion requires to cross a field-free region is given by $$t=721.3D(m/V_f)^{1/2} \tag{4}$$

where D is the length of the field-free region and $V_f$ is the kinetic energy in eV of the ions in this region.

Equation (3) can be applied to the embodiment of the pulsed accelerator 21 illustrated in FIG. 3. In this case $$\Delta V=V4=7000 \text{ volts}$$

$$d=d_1=1 \text{ cm}$$

$$V_i=(m/m_p)V0=1000(m/m_p)$$

$$V_f=\Delta V+V_i=7000+1000(m/m_p)$$

Where it is implicitly assumed that the potential V4 is switched on immediately after the packet of ions pass through grid 56.

Inserting these values into equation (3), the time to traverse the first portion of the pulsed ion accelerator is given by $$t_1=206.09[(7+m/m_p)^{1/2}](m/m_p)^{1/2}m^{1/2} \tag{5}$$

where m is the mass in kilodaltons.

And similarly for the second region of the pulsed ion accelerator $$\Delta V=7000$$

$$d=d_2=1 \text{ cm}$$

$$V_i=7000+1000m/m_p$$

$$V_f=V_i+\Delta V=14000+1000m/m_p$$

Where in this case the initial kinetic energy $V_i$ corresponds to the final kinetic energy from the first region.

The flight time through the second region of the pulsed accelerator 21 is given by $$t_2=206.09[(14+m/m_p)^{1/2}-(7+m/m_p)^{1/2}]m^{1/2} \tag{6}$$

And the time spent traveling a distance $d_3$=4 cm through the field-free tube 16" from grid 56" to grid 59 is given by $$t_3=2885.2\, m^{1/2}/(14+m/m_p)^{1/2} \tag{7}$$

and the total time is given by the sum $t_1+t_2+t_3$.

In this calculation the effect on the total flight time of ions to grid 59 produced by the time varying field between grids 59' and 59 due to application of potential V5(t) to conducting tube 16" has been neglected. So long as the distance between 59 and 59' is small compared to the total length $d_3$ and V5 is small compared to the sum of V3 and V4, no significant error is introduced by this approximation. If a more accurate estimate of the ideal values of V5(t) is required, the result given above can be used as a first approximation, and the shift in time resulting from application of this field can be used to derive a second approximation, and so on. For the practical cases considered so far the first approximation differs from the "exact" result by less than 1%.

Figure 4:
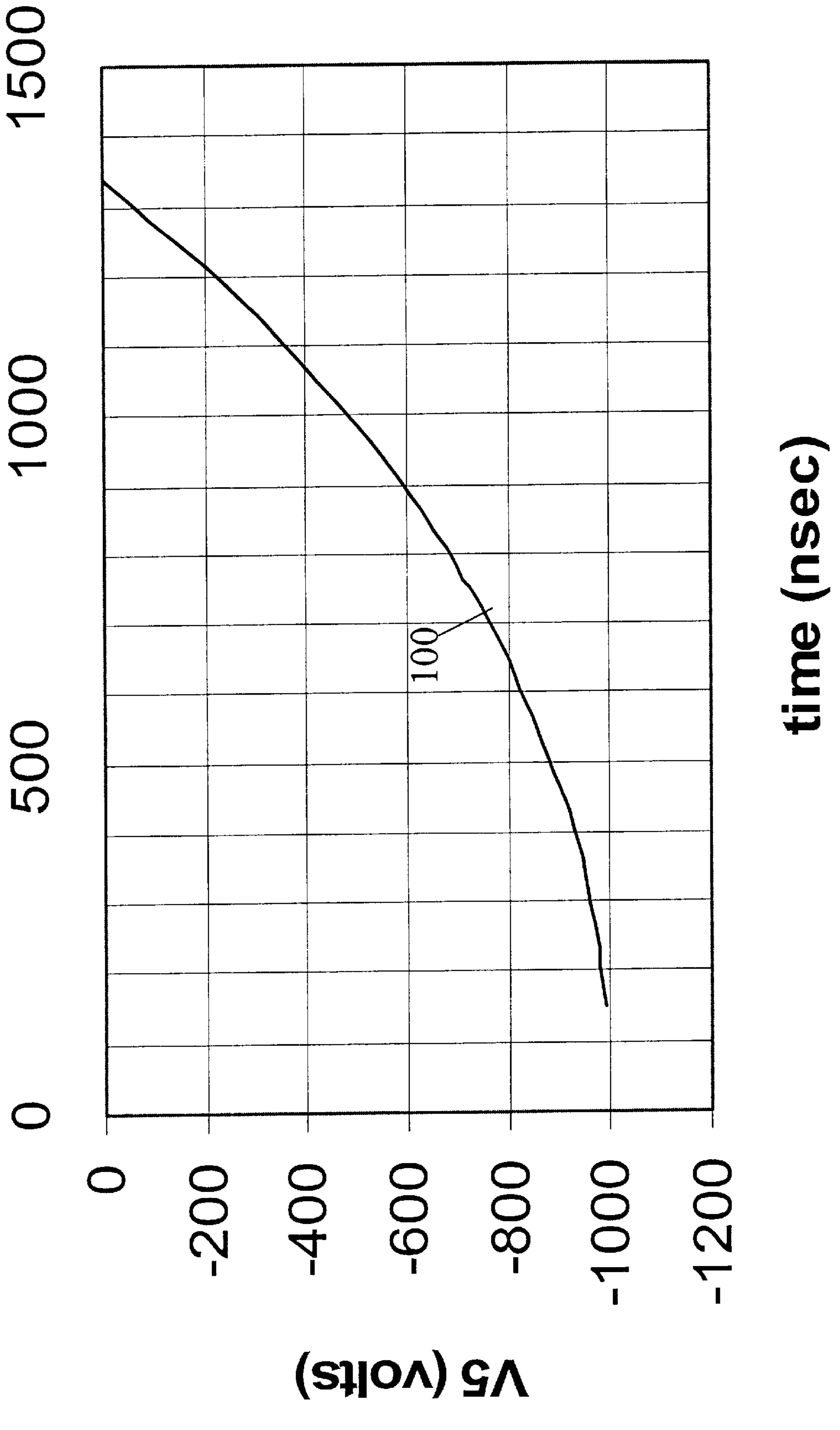
FIG. 4 is a graph of a calculated time varying waveform that can be applied to the fragment energy correction device of the present invention to improve the resolution of a tandem time-of-flight mass spectrometer.

FIG. 4 is a graph of a waveform 100 calculated for precursor mass of 1 kilodalton obtained by using equations (5), (6), and (7) that can be applied to the fragment energy correction device 23 of the present invention to improve the resolution of a tandem time-of-flight mass spectrometer. The calculation illustrated in FIG. 4 corresponds to a selected mass of 1 kilodalton when the collision energy is 1 kV, and the distances and potentials correspond to those given above.

Waveform 100 is a very close approximation to the ideal waveform for this case. The waveform 100 is a voltage waveform as a function of time. Each point on the waveform 100 corresponds to a voltage equal to the energy deficit of the fragment with a particular mass m as a function of the calculated time for the fragments ions of that particular mass m to pass through grid 59 and enter field-free drift tube 16". Thus, by applying the waveform 100 to the conducting tube 16" of the energy correction device 23, the parent ions and fragment ions of interest leave the energy corrector with substantially the same kinetic energy. In a preferred embodiment the length of the conducting tube 16'" attached to grid 56" and the voltages applied to the pulsed accelerator 21 are chosen so that selected ions and fragments thereof are focused in time at or near grid 59.

These ideal waveforms for application to the energy corrector 23 as illustrated in preferred embodiment 70 correspond to a selected mass $m_p$ equal to 1000 daltons. For any other selected mass the time scale is adjusted by multiplying by the square root of the selected mass divided by 1000, as can be seen by inspection of equations 1–7 above.

Figure 5:
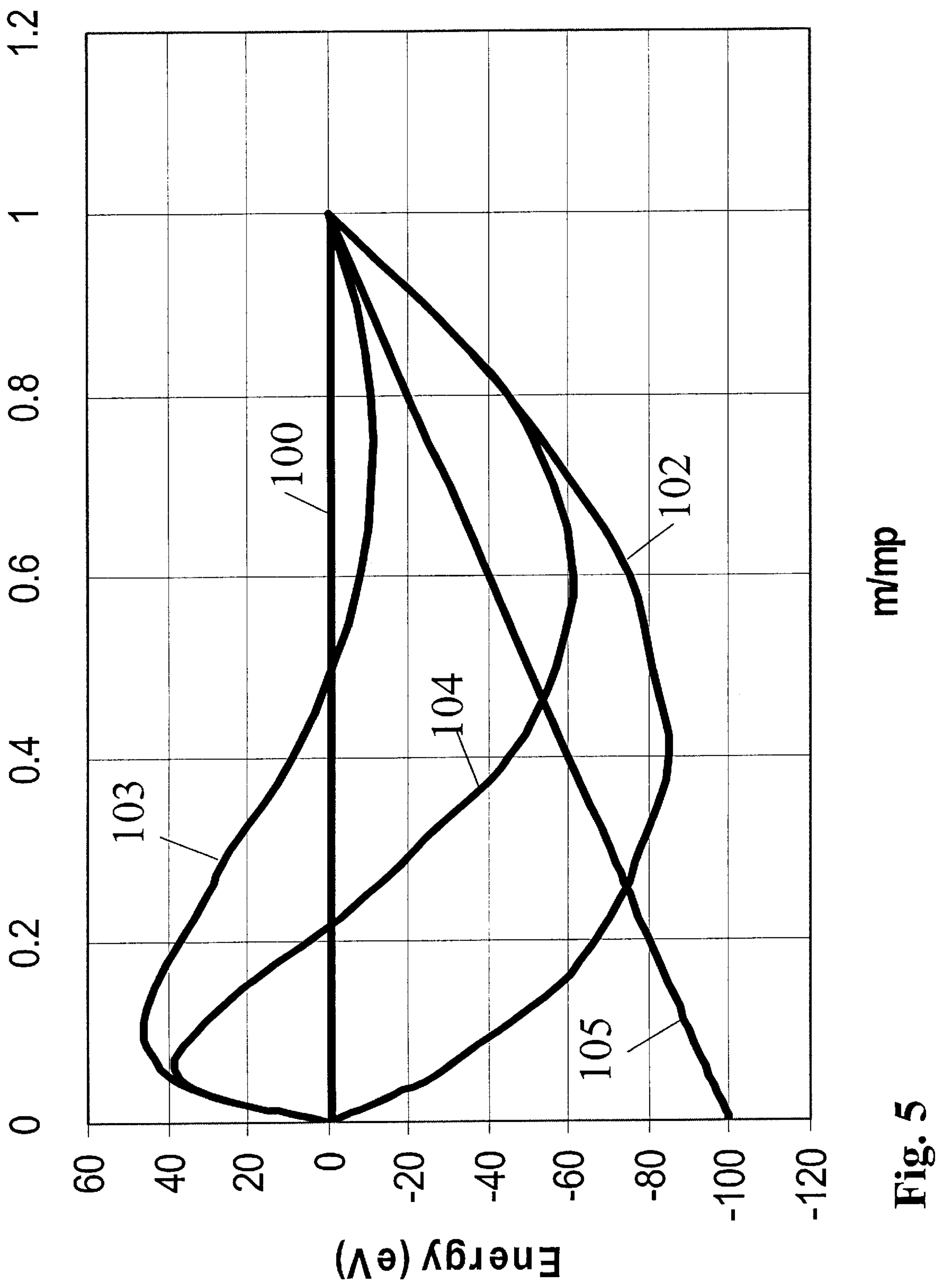
FIG. 5 illustrates the kinetic energy of fragment ions resulting from application of the time varying waveform of FIG. 4 to the energy correction device together with the error resulting from use of various approximations to the "ideal" waveform.

In practice, the waveform applied to the conducting tube 16" does not have to exactly match the ideal calculated waveform 100 because the resolution depends on the square of the energy deficit. For example, reducing the energy deficit by a factor of 10 improves the theoretical resolution by a factor of 100 and this is generally sufficient to compensate for the loss of kinetic energy due to fragmentation. Examples of satisfactory approximations to the ideal waveform and the energy errors as a function of fragment mass m, are illustrated in FIG. 5. The approximations used in these examples are the following:

$$V5(A)=V0[1-(t/t_p)^2], \quad \text{(waveform 102)}$$

Where $t_p$ is the time at which the ideal waveform 100 reaches zero volts $$V5(B)=V0[1-\{(t-t_0)/(t_p-t_0)\}^2] \quad \text{(waveform 103)}$$

$$V5(C)=V0\cos[90(t-t_0)/(t_p-t_0)] \quad \text{(waveform 104)}$$

Where $t_0=t_p/5$ in both cases.

Also shown in FIG. 5 is the uncorrected energy error (waveform 105) as a function of mass m. The uncorrected error is divided by 10 in FIG. 5 to allow it to be plotted on the same scale as the errors after correction. As can be seen from FIG. 5, the approximation illustrated in waveform 103 reduces the energy error by more than a factor of 20 over the entire mass range, and is clearly the best choice among these three. Nevertheless, all three give significant improvement compared to no energy correction.

The present invention also relates to improving the resolution of tandem mass spectrometers by optimizing the resolution in both the first and second mass spectrometer unit. In prior art tandem TOF mass spectrometers, a compromise is made between resolution in the initial mass selection and resolution in the fragment spectra. The magnitude of the pulse applied to the pulsed ion source 12 and/or the time delay of the delayed extraction can be adjusted to cause the selected ions to be focused in time at any point along the ion trajectory.

For optimum resolution in the first mass spectrometer unit, the selected ions should be focused at the center of the timed ion selector 14. However, for optimal resolution in the second mass spectrometer unit, the ions should be focused at or near the entrance 154 of the second ion acceleration region 21. It is possible to construct a tandem mass spectrometer with near optimum resolution in both the first and second mass spectrometer unit by placing the timed ion selector 14 and second mass spectrometer unit in close proximity to each other. Unfortunately, such a configuration does not allow fragmentation to complete. To increase the yield of fragments, it is desirable to allow some time for ions to fragment between primary ion selection and re-acceleration in the second ion source.

Figure 7:
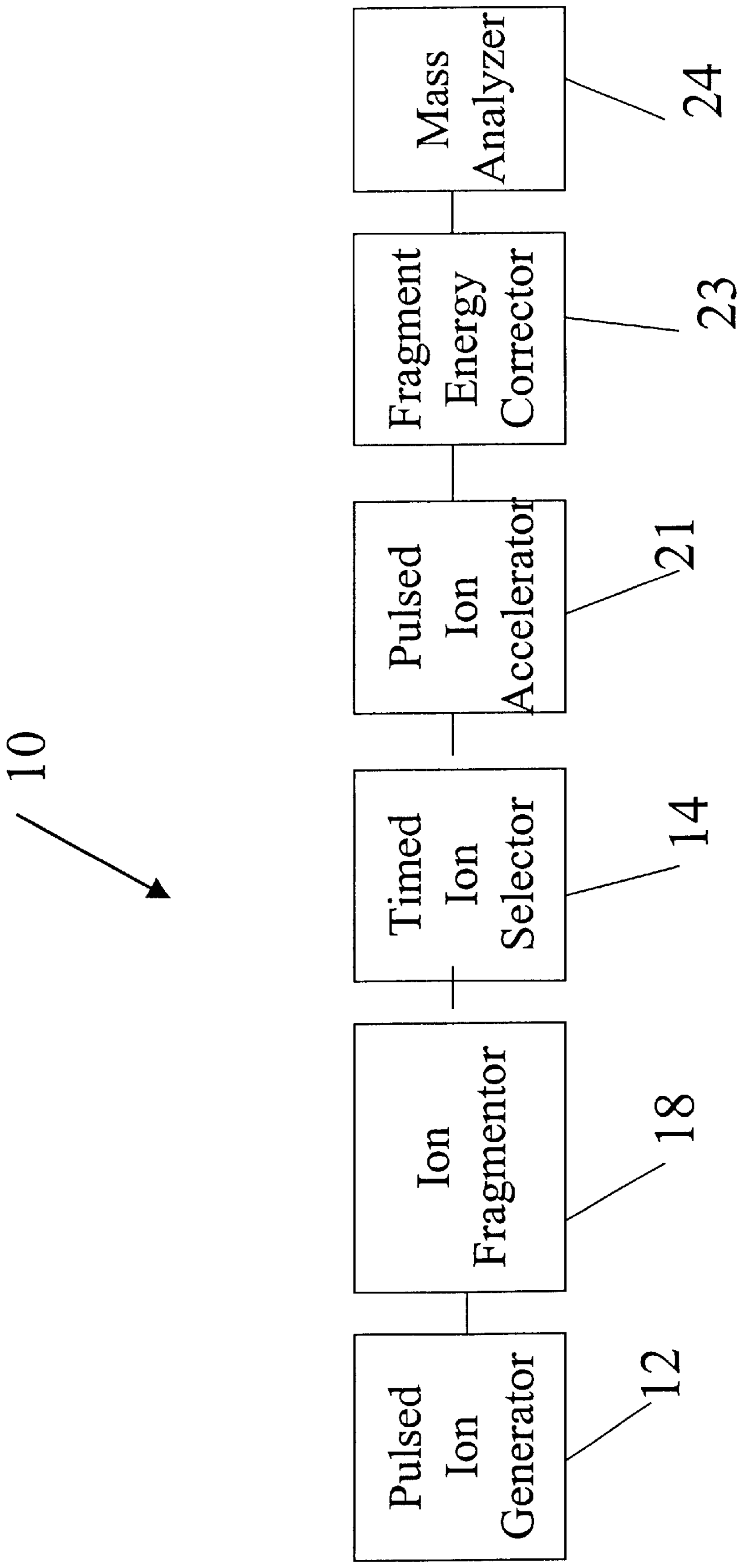
FIG. 7 illustrates a block diagram of another embodiment of a tandem time-off-light mass spectrometer of the present invention that includes a fragment energy correction device according to the present invention in which the timed ion selector is positioned between the ion fragmentor and the second ion accelerator.

One solution to this problem is to place the timed ion selector 14 in the field-free space between the ion fragmentor 18 and the pulsed ion accelerator 21 as shown in block diagram in FIG. 7. This requires floating the pulsed deflectors at potential V3 rather than operating about ground potential. Since the fragment ions produced from a particular precursor mass continue to travel in a field-free space with essentially the same velocity as the precursor, the timed ion selector can transmit a selected precursor mass and its fragments and reject precursor masses and fragments outside the selected mass range.

Figure 6A:
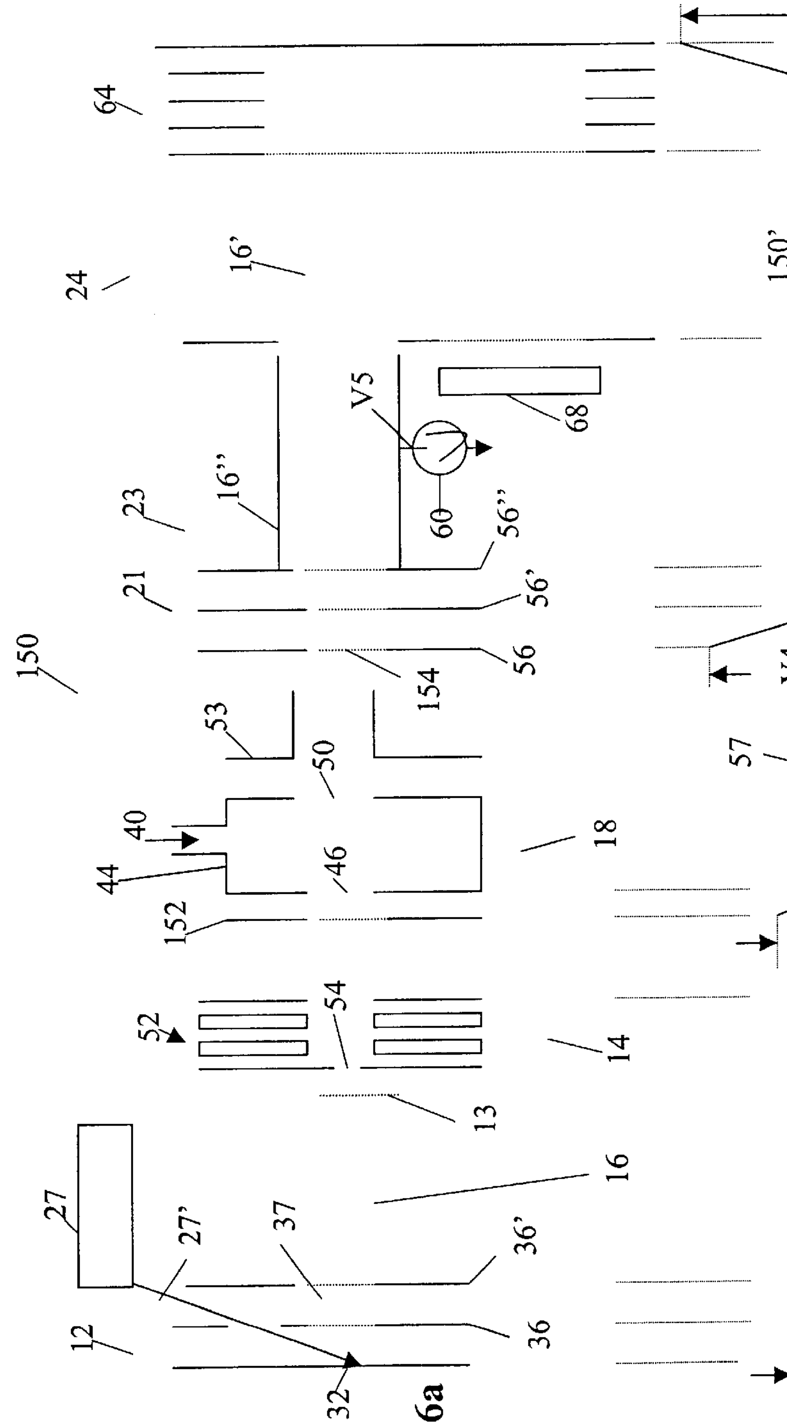
FIG. 6*a* illustrates a schematic diagram of a tandem time-of-flight mass spectrometer of the present invention that includes a grid between the timed ion selector and the collision cell that brings ions to a time focus proximate to the entrance of the second ion accelerator.

A preferred embodiment for simultaneously improving the resolution in both the first and second mass spectrometer units is shown in FIG. 6*a*. FIG. 6*a* illustrates a schematic diagram of a tandem time-of-flight mass spectrometer 150 of the present invention that includes a grid 152 positioned between the timed ion selector 14 and the collision cell 44 that brings ions to a time focus proximate to an entrance 154 of the second ion acceleration region 21. The tandem TOF mass spectrometer 150 is similar to the tandem TOF mass spectrometer 10 of FIG. 2*a*, except for the grid 152. The tandem TOF mass spectrometer of FIG. 6*a* provides near optimum resolution in the first and second mass spectrometer unit by providing an additional grid 152 interposed between the timed ion selector 14 and the collision cell 44.

Figure 6B:
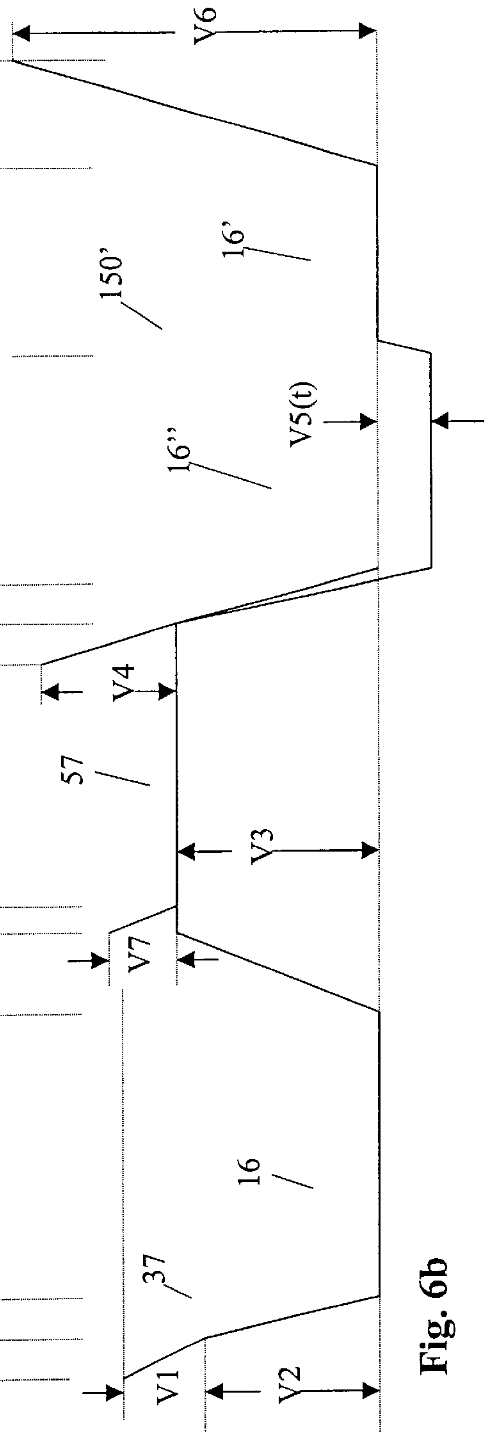
FIG. 6*b* illustrates a potential diagram of a tandem time-of-flight mass spectrometer of FIG. 6*a* that includes a grid between the timed ion selector and the collision cell that brings ions to a time focus proximate to the entrance of the second ion accelerator.

FIG. 6*b* illustrates a potential diagram of a tandem time-of-flight mass spectrometer of FIG. 6*a* that includes a grid between the timed ion selector and the collision cell that brings ions to a time focus proximate to the entrance of the second ion accelerator. The potential diagram is similar to the potential diagram of FIG. 2*b*, except for the potential V7 on the grid 152.

The grid 152 is maintained at substantially the same potential as the collision cell 44 until a short time interval after the ions of interest, corresponding to a particular value of m/z, have passed through the grid 152. The voltage on the grid 152 is then switched to a higher potential V7, which is selected to bring the ions to a time focus at or near the entrance to the second ion accelerator. Even though the ions in the packet may have a distribution of velocities, the spread in position within the second accelerator at the time the pulse V7 is applied is relatively small. The improvement in resolution due to the near optimum resolution in both the first and second mass spectrometer unit and the improvement in resolution due to the increased energy of the fragments relative to the selected ions results in a high resolution fragment spectra that has a resolution that is nearly independent of mass.

Equivalents

While the invention has been particularly shown and described with reference to specific preferred embodiments, it should be understood by those skilled in the art that various changes in form and detail may be made therein without departing from the spirit and scope of the invention as defined by the appended claims. For example, various fields and potentials may be shifted by constant amounts without affecting the nature of the invention. The selection of which regions are at zero potential is a matter of convenience as long as the relationships are maintained.

What is claimed is:

1. A tandem time-of-flight mass spectrometer comprising:

a) a pulsed source of ions that focuses a packet of ions substantially within a predetermined mass-to-charge ratio range onto a focal plane in a flight path of the ions;

b) an ion selector that receives the focused packet of ions, wherein the ion selector selects ions substantially within the predetermined mass-to-charge ratio range and rejects substantially all other ions;

c) an ion fragmentor positioned in the flight path of the ions, the ion fragmentor fragmenting a fraction of the ions;

d) a pulsed ion accelerator positioned in a flight path of the selected ions and fragments thereof after the ion fragmentor, wherein the pulsed ion accelerator accelerates the selected ions and fragments thereof; and e) an electrode positioned in the flight path of the accelerated selected ions and fragments thereof after the pulsed ion accelerator, the electrode being biased with a time varying bias voltage that increases the kinetic energy of the fragments relative to the selected ions.

2. The mass spectrometer of claim 1 wherein the ion selector that receives the focused packet of ions is positioned substantially at the focal plane.

3. The mass spectrometer of claim 1 wherein the focal plane is located between the ion selector and the pulsed ion accelerator.

4. The mass spectrometer of claim 1 wherein a time dispersion of the packet of ions is substantially minimized at the focal plane.

5. The mass spectrometer of claim 1 wherein the kinetic energy of the fragments relative to the selected ions is increased to at least partially compensate for an energy loss experienced by the fragments due to fragmentation.

6. The mass spectrometer of claim 5 wherein the kinetic energy of the fragments relative to the selected ions is increased to substantially equal the kinetic energy of the selected ions.

7. The mass spectrometer of claim 1 wherein the electrode comprises a grid coupled to a conducting drift tube that is electrically isolated from ground.

8. The mass spectrometer of claim 7 wherein a length of the conducting drift tube is chosen so that the selected ions and fragments thereof substantially co-exist during a period where the time varying bias voltage is non-zero.

9. The mass spectrometer of claim 7 further comprising a substantially field-free drift region positioned in the flight path of the selected ions and fragments thereof after the conducting drift tube.

10. The mass spectrometer of claim 9 wherein a length of the conducting drift tube is chosen so that the selected ions and fragments thereof substantially co-exist during a period where the time varying bias voltage is non-zero relative to the potential applied to the field-free drift region.

11. The mass spectrometer of claim 9 further comprising an ion guide positioned in the substantially field-free region, the ion guide increasing the efficiency of ion transmission.

12. The mass spectrometer of claim 7 wherein a second focal plane is formed substantially proximate to an entrance of the conductive drift tube.

13. The mass spectrometer of claim 1 wherein a second focal plane is formed between the pulsed ion accelerator and the electrode.

14. The mass spectrometer of claim 12 wherein a time dispersion of the packet of ions is substantially minimized at the second focal plane.

15. The mass spectrometer of claim 1 wherein the pulsed source of ions comprises a laser desorption/ionization ion source having delayed extraction.

16. The mass spectrometer of claim 1 wherein the ion fragmentor is positioned in the flight path of the selected ions, the ion fragmentor fragmenting a fraction of the selected ions.

17. The mass spectrometer of claim 1 wherein the ion selector is positioned in the flight path of the fragmented ions, the ion selector selecting ions substantially within the predetermined mass-to-charge ratio range and fragments thereof and rejecting substantially all other ions.

18. The mass spectrometer of claim 1 wherein the ion selector and the ion fragmentor are contained in a single device.

19. The mass spectrometer of claim 1 wherein the time varying bias voltage increases the energy of the fragments relative to the selected ions, thereby increasing the mass resolution.

20. The mass spectrometer of claim 1 wherein the pulsed source of ions comprises an injector that injects ions into a field-free region and a pulsed ion accelerator that extracts the ions in a direction that is orthogonal to a direction of injection.

21. The mass spectrometer of claim 1 wherein the ion selector comprises a drift tube and a timed ion deflector.

22. The mass spectrometer of claim 1 wherein the ion selector selects ions by transmitting ions having substantially the predetermined mass-to-charge ratio and blocks substantially all other ions.

23. The mass spectrometer of claim 1 wherein the ion fragmentor comprises a collision cell wherein the packet of ions collide with neutral molecules which causes ions in the packet of ions to energize sufficiently to fragment into ionic and neutral fragments.

24. The mass spectrometer of claim 1 wherein the ion fragmentor comprises a photo-dissociation cell wherein ions are irradiated with a beam of photons.

25. The mass spectrometer of claim 1 wherein the ion fragmentor comprises a surface dissociation fragmentor wherein ions collide with a solid or liquid surface.

26. The mass spectrometer of claim 1 further comprising an ion mirror positioned in the path of the selected ions and the fragments thereof after the electrode.

27. The mass spectrometer of claim 1 further comprising an ion detector positioned after the electrode, the ion detector detecting the selected ions and fragments thereof.

28. A method for improving mass resolution in tandem time-of-flight mass spectrometers, the method comprising:

a) generating a pulse of ions from a sample of interest;

b) selecting ions from the pulse of ions that are substantially within a predetermined mass-to-charge ratio range and rejecting substantially all other ions;

c) fragmenting a fraction of the selected ions; and d) exposing the selected ions and fragments thereof to a time varying bias that adds energy to the fragments which at least partially compensates for energy lost due to fragmentation; and e) analyzing the selected ions and fragments thereof by time of flight mass spectrometry.

29. The method of claim 28 wherein the step of producing the pulse of ions comprises a method selected from the group consisting of: electrospray, pneumatically-assisted electrospray, chemical ionization, MALDI, and ICP.

30. The method of claim 28 wherein the step of exposing the selected ions and fragments thereof to a time varying bias voltage comprises passing the ions through at least one of a grid and a conducting drift tube, wherein the at least one of the grid and the conducting drift tube are biased with the time varying bias voltage.

31. The method of claim 28 wherein the step of selecting ions comprises focusing generated ions having a predetermined mass-to-charge ratio range onto a timed ion selector and transmitting the selected ions through the timed ion selector while substantially blocking all other ions.

32. The method of claim 28 wherein the step of fragmenting a fraction of the selected ions comprises exciting the selected ions by colliding the selected ion with neutral gas molecules.

33. The method of claim 28 further comprising passing the selected ions and fragments thereof through a nearly field-free region after fragmentation, thereby allowing the ions to substantially complete fragmentation.

34. The method of claim 28 further comprising accelerating the selected ions and fragments thereof after fragmentation.

35. A tandem time-of-flight mass spectrometer comprising:

a) a pulsed source of ions that focuses a packet of ions substantially within a predetermined mass-to-charge ratio range onto a focal plane in a flight path of the packet of ions;

b) an ion selector positioned substantially at the focal plane that receives the focused packet of ions, wherein the ion selector selects ions substantially within the predetermined mass-to-charge ratio range and rejects substantially all other ions;

c) an ion fragmentor positioned in the flight path of the selected ions, the ion fragmentor fragmenting a fraction of the selected ions;

d) a first drift space positioned in a flight path of the selected ions and fragments thereof that facilitates fragmentation;

e) a pulsed ion accelerator positioned in a flight path of the selected ions and fragments thereof after the first drift space, wherein the pulsed ion accelerator accelerates the selected ions and fragments thereof;

f) a conducting tube positioned in the flight path of the selected ions and fragments thereof after the pulse ion accelerator, the conducting tube being biased with a time varying bias voltage that increases the energy of the fragments relative to the selected ions; and g) an ion detector that detects the selected ions and fragments thereof.

36. The mass spectrometer of claim 35 further comprising an ion mirror that is positioned in the flight path of the selected ions and fragments thereof between the conducting tube and the ion detector.

37. The mass spectrometer of claim 35 further comprising a second drift space positioned in the flight path of the selected ions and fragments thereof between the conducting tube and the ion detector.

38. A tandem time-of-flight mass spectrometer comprising:

a) a pulsed source of ions that focuses a packet of ions substantially within a predetermined mass-to-charge ratio range onto a focal plane in a flight path of the ions;

b) an ion selector that receives the focused packet of ions, wherein the ion selector selects ions substantially within the predetermined mass-to-charge ratio range and rejects substantially all other ions;

c) an ion fragmentor positioned in the flight path of the selected ions, the ion fragmentor fragmenting a fraction of the selected ions;

d) a pulsed ion accelerator positioned in a flight path of the selected ions and fragments thereof after the ion fragmentor, wherein the pulsed ion accelerator accelerates the selected ions and fragments thereof; and e) an electrode positioned in the flight path of the accelerated selected ions and fragments thereof after the pulsed ion accelerator, the electrode being biased with a time varying bias voltage that increases the kinetic energy of the fragments relative to the selected ions.

39. The mass spectrometer of claim 38 wherein the time varying bias voltage increases the energy of the fragments relative to the selected ions, thereby increasing at least one of mass resolution and ion selectivity.

40. The mass spectrometer of claim 38 wherein the kinetic energy of the fragments relative to the selected ions is increased to at least partially compensate for an energy loss experienced by the fragments due to fragmentation.

41. The mass spectrometer of claim 38 wherein the focal plane is located between the ion selector and the pulsed ion accelerator.

42. The mass spectrometer of claim 38 wherein a time dispersion of the packet of ions is substantially minimized at the focal plane.

43. The mass spectrometer of claim 38 wherein a second focal plane is formed between the pulsed ion accelerator and the electrode.

44. The mass spectrometer of claim 43 wherein a time dispersion of the packet of ions is substantially minimized at the second focal plane.

45. The mass spectrometer of claim 38 wherein the pulsed source of ions comprises a laser desorption/ionization ion source having delayed extraction.

46. A tandem time-of-flight mass spectrometer comprising:

a) a pulsed source of ions that focuses a packet of ions substantially within a predetermined mass-to-charge ratio range onto a focal plane in a flight path of the ions;

b) an ion fragmentor that receives the focused packet of ions, the ion fragmentor fragmenting a fraction of the ions;

c) an ion selector positioned in the flight path of the fragmented ions, wherein the ion selector selects fragmented ions substantially within the predetermined mass-to-charge ratio range and rejects substantially all other ions and ion fragments;

d) a pulsed ion accelerator positioned in a flight path of the selected ions and fragments thereof after the ion fragmentor, wherein the pulsed ion accelerator accelerates the selected ions and fragments thereof; and e) an electrode positioned in the flight path of the accelerated selected ions and fragments thereof after the pulsed ion accelerator, the electrode being biased with a time varying bias voltage that increases the kinetic energy of the fragments relative to the selected ions.

47. The mass spectrometer of claim 46 wherein the time varying bias voltage increases the energy of the fragments relative to the selected ions, thereby increasing at least one of mass resolution and ion selectivity.

48. The mass spectrometer of claim 46 wherein the kinetic energy of the fragments relative to the selected ions is increased to at least partially compensate for an energy loss experienced by the fragments due to fragmentation.

49. The mass spectrometer of claim 46 wherein the focal plane is located between the ion selector and the pulsed ion accelerator.

50. The mass spectrometer of claim 46 wherein a time dispersion of the packet of ions is substantially minimized at the focal plane.

51. The mass spectrometer of claim 46 wherein a second focal plane is formed between the pulsed ion accelerator and the electrode.

52. The mass spectrometer of claim 51 wherein a time dispersion of the packet of ions is substantially minimized at the second focal plane.

53. The mass spectrometer of claim 46 wherein the pulsed source of ions comprises a laser desorption/ionization ion source having delayed extraction.

* * * * *